(12) United States Patent
Göres et al.

(10) Patent No.: US 6,350,830 B1
(45) Date of Patent: Feb. 26, 2002

(54) CATALYST SYSTEM, METHOD FOR THE PRODUCTION THEREOF AND ITS USE FOR THE POLYMERIZATION OF OLEFINS

(75) Inventors: Markus Göres, Eschborn; Carsten Bingel, Kriftel; Cornelia Fritze, Frankfurt, all of (DE)

(73) Assignee: Tagor GmbH, Mainz (DE)

( * ) Notice: Subject to any disclaimer, the term of this patent is extended or adjusted under 35 U.S.C. 154(b) by 0 days.

(21) Appl. No.: 09/622,310

(22) PCT Filed: Feb. 13, 1999

(86) PCT No.: PCT/EP99/00958

§ 371 Date: Aug. 16, 2000

§ 102(e) Date: Aug. 16, 2000

(87) PCT Pub. No.: WO99/42497

PCT Pub. Date: Aug. 26, 1999

(30) Foreign Application Priority Data

Feb. 19, 1998 (DE) .......................................... 198 06 918

(51) Int. Cl.⁷ .................................................. C08F 4/52
(52) U.S. Cl. ...................... 526/159; 526/127; 526/128; 526/129; 502/153; 502/154; 502/155
(58) Field of Search ................................ 526/127, 128, 526/129, 159; 502/153, 155, 154

(56) References Cited

U.S. PATENT DOCUMENTS

| | | |
|---|---|---|
| 5,278,264 A | 1/1994 | Spaleck et al. |
| 5,329,033 A | 7/1994 | Spaleck et al. |
| 5,672,668 A | 9/1997 | Winter et al. |
| 5,770,753 A | 6/1998 | Kueber et al. |
| 5,786,432 A | 7/1998 | Kueber et al. |
| 5,840,644 A | 11/1998 | Kueber et al. |

FOREIGN PATENT DOCUMENTS

| | | |
|---|---|---|
| CA | 2241812 | 4/1997 |
| EP | 530 647 | 3/1993 |
| EP | 0 584 609 A2 * | 8/1993 |
| EP | 576 970 | 1/1994 |
| EP | 629 632 | 12/1994 |
| EP | 646 604 | 4/1995 |
| EP | 653 433 | 5/1995 |
| EP | 0 882 731 A2 * | 9/1998 |
| EP | 822 731 | 12/1998 |
| WO | 97/11775 | 4/1997 |
| WO | 98/40331 | 9/1998 |

OTHER PUBLICATIONS

J. Org. Chem. 232(1982) 233–247, Wild et al.

Stereochemistry 1967, vol. 1, 39–91.

* cited by examiner

*Primary Examiner*—Donald R. Wilson
*Assistant Examiner*—William K Cheung
(74) *Attorney, Agent, or Firm*—Keil & Weinkauf

(57) ABSTRACT

A catalyst system in which the ratio of rac isomer to meso isomer of the metallocene is from 1:10 to 2:1 can be used for the polymerization of olefins.

6 Claims, No Drawings

CATALYST SYSTEM, METHOD FOR THE PRODUCTION THEREOF AND ITS USE FOR THE POLYMERIZATION OF OLEFINS

The present invention relates to catalyst systems, a process for preparing them and their use in the polymerization of olefins.

Processes for preparing polyolefins with the aid of soluble, homogeneous catalyst systems comprising a transition metal component of the metallocene type and a cocatalyst component such as an aluminoxane, a Lewis acid or an ionic compound are known. These catalysts have a high activity and give polymers and copolymers having a narrow molar mass distribution.

In polymerization processes using soluble, homogeneous catalyst systems, heavy deposits are formed on reactor walls and stirrer if the polymer is obtained as a solid. These deposits are formed by agglomeration of the polymer particles whenever metallocene and/or cocatalyst are present in dissolved form in the suspension. Such deposits in the reactor systems have to be removed regularly since they rapidly reach considerable thicknesses, have a high strength and prevent heat exchange to the cooling medium. Such homogeneous catalyst systems cannot be used industrially in the modern polymerization processes carried out in the liquid monomer or in the gas phase.

To avoid deposit formation in the reactor, catalyst systems in which the metallocene and/or the aluminum compound serving as cocatalyst are fixed to an inorganic support material have been proposed.

EP-A-0,576,970 discloses metallocenes and corresponding supported catalyst systems.

Highly active, supported catalyst systems for preparing industrially important polyolefins having a high tacticity and a high melting point, in particular polypropylenes, comprise ansa-metallocenes in racemic or pseudoracemic form and are known, for example, from EP-A-0,530,647; EP-A-0,576,970 and EP-A-0,653,433.

The synthesis of ansa-metallocenes gives them as isomer mixtures (rac form and meso form or pseudo-rac/pseudo-meso form), so that an additional and costly process step for separating rac and meso form (or the pseudo forms) is necessary. A definition of the terms rac and meso form may be found in Brinzinger et al., Journal of Organometallic Chemistry, 232 (1982) page 233, and Schlögl, Top. Stereochem., 1 (1967) page 39 ff.

It is thus an object of the invention to find an inexpensive, highly active catalyst system for preparing polyolefins having a high tacticity and a high melting point, in particular polypropylenes, and also a simple and economical process for preparing such a catalyst system, which requires no additional separation of rac and meso forms of the metallocene components obtained.

It has now surprisingly been found that the object of the invention is achieved by a supported catalyst system comprising at least one specifically substituted metallocene as rac/meso isomer mixture, at least one cocatalyst, at least one passivated support and, if desired, at least one further additive component.

The present invention provides a catalyst system comprising a) at least one support,
b) at least one cocatalyst,
c) an rac/meso isomer mixture of at least one metallocene of the formula (I):

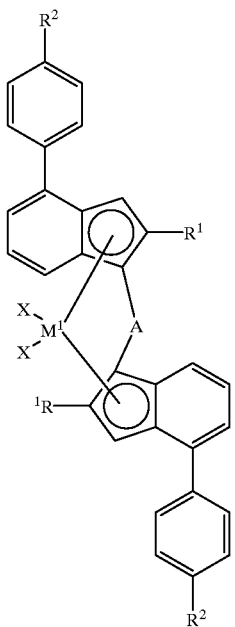

(I)

where
R$^1$ and R$^2$ are identical or different and are each a hydrogen atom, a C$_1$–C$_{20}$-hydrocarbon group such as a C$_1$–C$_{20}$-alkyl group, preferably methyl, ethyl, n-propyl, isopropyl, n-butyl, sec-butyl, isobutyl, tert-butyl, pentyl and hexyl, a C$_6$–C$_{14}$-aryl group, a C$_2$–C$_{20}$-alkenyl group, with the restriction that R$^1$ is not methyl when R$^2$ is hydrogen, M$^1$ is a transition metal of group 4, 5 or 6 of the Periodic Table of the Elements, for example titanium, zirconium, hafnium, vanadium, niobium, tantalum, chromium, molybdenum or tungsten, preferably titanium, zirconium, hafnium, particularly preferably zirconium, A is a bridge of the formula:

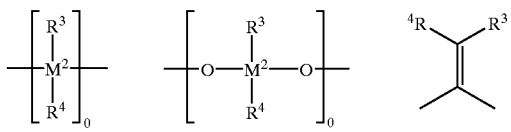

or =BR$^3$, AlR$^3$, —S—, —SO—, —SO$_2$—, =NR$^3$, =PR$^3$, =P(O)R$^3$, o-phenylene, 2,2'-biphenylene, where M$^2$ is carbon, silicon, germanium, tin, nitrogen or phosphorus, preferably carbon, silicon or germanium, in particular carbon or silicon, o is 1, 2, 3 or 4, preferably 1 or 2, R$^3$ and R$^4$ are identical or different and are each, independently of one another, a hydrogen atom, halogen, a C$_1$–C$_{20}$-group such as (C$_1$–C$_{20}$)-alkyl, in particular a methyl group, (C$_6$–C$_{14}$)-aryl, in particular a phenyl or naphthyl group, (C$_1$–C$_{10}$)-alkoxy, (C$_2$–C$_{10}$)-alkenyl, (C$_7$–C$_{20}$)-arylalkyl, (C$_7$–C$_{20}$)-alkylaryl, (C$_6$–C$_{10}$)-aryloxy, (C$_1$–C$_{10}$)-fluoroalkyl, (C$_6$–C$_{10}$)-haloaryl, (C$_2$–C$_{10}$)-alkynyl, (C$_3$–C$_{20}$)-alkylsilyl such as trimethylsilyl, triethylsilyl, tert-butyldimethylsilyl, (C$_3$–C$_{20}$)- arylsilyl such as triphenylsilyl, or (C$_3$–C$_{20}$)-alkylarylsilyl such as dimethylphenylsilyl, diphenylsilyl or diphenyl-tert-butylsilyl or R$^3$ and R$^4$ may together form a monocyclic or polycyclic ring system, and A is preferably dimethylsilanediyl, dimethylgermanediyl, ethylidene, methylethylidene, 1,1-dimethylethylidene, 1,2-dimethylethylidene, tetramethylethylidene, isopropylidene, methylphenylmethylidene, diphenylmethylidene, particularly preferably dimethylsilanediyl, dimethylgermanediyl or ethylidene, X are identical or different and are each a hydrogen atom, a halogen atom, such as fluorine, chlorine, bromine or iodine, a hydroxyl group, a C$_1$–C$_{10}$-alkyl group such as methyl, ethyl, propyl, isopropyl, n-butyl, isobutyl, sec-butyl, tert-butyl, hexyl, cyclohexyl, a C$_6$–C$_{15}$-aryl group such as phenyl, naphthyl, a C$_1$–C$_{10}$-alkoxy group such as methoxy, ethoxy, tert-butoxy, a C$_6$–C$_{15}$-aryloxy group, a benzyl group, an NR$^5_2$ group, where R$^5$ are identical or different and are each a C$_1$–C$_{10}$-alkyl group, in particular methyl and/or ethyl, a C$_6$–C$_{15}$-aryl group, a (CH$_3$)$_3$Si group, preferably a chlorine atom, a fluorine atom, a methyl group, a benzyl group, an Nme$_2$ group, particularly preferably a chlorine atom or a methyl group, where the ratio of rac isomer to meso isomer of the metallocene of the formula (I) in the catalyst system of the invention is from 1:10 to 2:1, preferably from 1:2 to 3:2.

The metallocene of the formula (I) is preferably one of the compounds:

dimethylsilanediylbis(2-methyl-4-(4'-tert-butylphenyl)indenyl)zirconium dichloride
dimethylsilanediylbis(2-methyl-4-(4'-tert-butylphenyl)indenyl)hafnium dichloride
dimethylsilanediylbis(2-methyl-4-(4'-tert-butylphenyl)indenyl)titanium dichloride
dimethylsilanediylbis(2-methyl-4-(4'-methylphenyl)indenyl)zirconium dichloride
dimethylsilanediylbis(2-methyl-4-(4'-ethylphenyl)indenyl)zirconium dichloride
dimethylsilanediylbis(2-methyl-4-(4'-n-propylphenyl)indenyl)zirconium dichloride
dimethylsilanediylbis(2-methyl-4-(4'-isopropylphenyl)indenyl)zirconium dichloride
dimethylsilanediylbis(2-methyl-4-(4'-n-butylphenyl)indenyl)zirconium dichloride
dimethylsilanediylbis(2-methyl-4-(4'-hexylphenyl)indenyl)zirconium dichloride
dimethylsilanediylbis(2-methyl-4-(4'-sec-butylphenyl)indenyl)zirconium dichloride
dimethylsilanediylbis(2-ethyl-4-phenyl)indenyl)zirconium dichloride
dimethylsilanediylbis(2-ethyl-4-(4'-methylphenyl)indenyl)zirconium dichloride
dimethylsilanediylbis(2-ethyl-4-(4'-ethylphenyl)indenyl)zirconium dichloride
dimethylsilanediylbis(2-ethyl-4-(4'-n-propylphenyl)indenyl)zirconium dichloride
dimethylsilanediylbis(2-ethyl-4-(4'-isopropylphenyl)indenyl)zirconium dichloride
dimethylsilanediylbis(2-ethyl-4-(4'-n-butylphenyl)indenyl)zirconium dichloride
dimethylsilanediylbis(2-ethyl-4-(4'-hexylphenyl)indenyl)zirconium dichloride
dimethylsilanediylbis(2-ethyl-4-(4'-pentylphenyl)indenyl)zirconium dichloride
dimethylsilanediylbis(2-ethyl-4-(4'-cyclohexylphenyl)indenyl)zirconium dichloride
dimethylsilanediylbis(2-ethyl-4-(4'-sec-butylphenyl)indenyl)zirconium dichloride
dimethylsilanediylbis(2-ethyl-4-(4'-tert-butylphenyl)indenyl)zirconium dichloride
dimethylsilanediylbis(2-n-propyl-4-phenyl)indenyl)zirconium dichloride
dimethylsilanediylbis(2-n-propyl-4-(4'-methylphenyl)indenyl)zirconium dichloride
dimethylsilanediylbis(2-n-propyl-4-(4'-ethylphenyl)indenyl)zirconium dichloride
dimethylsilanediylbis(2-n-propyl-4-(4'-n-propylphenyl)indenyl)zirconium dichloride
dimethylsilanediylbis(2-n-propyl-4-(4'-isopropylphenyl)indenyl)zirconium dichloride
dimethylsilanediylbis(2-n-propyl-4-(4'-n-butylpheny)indenyl)zirconium dichloride
dimethylsilanediylbis(2-n-propyl-4-(4'-hexylphenyl)indenyl)zirconium dichloride
dimethylsilanediylbis(2-n-propyl-4-(4'-cyclohexylphenyl)indenyl)zirconium dichloride
dimethylsilanediylbis(2-n-propyl-4-sec-butylphenyl)indenyl)zirconium dichloride
dimethylsilanediylbis(2-n-butyl-4-phenyl)indenyl)zirconium dichloride
dimethylsilanediylbis(2-n-butyl-4-(4'-methylphenyl)indenyl)zirconium dichloride
dimethylsilanediylbis(2-n-butyl-4-(4'-ethylphenyl)indenyl)zirconium dichloride
dimethylsilanediylbis(2-n-butyl-4-(4'-n-propylphenyl indenyl)zirconium dichloride
dimethylsilanediylbis(2-n-butyl-4-(4'-isopropylphenyl)indenyl)zirconium dichloride
dimethylsilanediylbis(2-n-butyl-4-(4'-n-butylphenyl)indenyl)zirconium dichloride
dimethylsilanediylbis(2-n-butyl-4-(4'-hexylphenyl)indenyl)zirconium dichloride
dimethylsilanediylbis(2-n-butyl-4-(4'-cyclohexylphenyl)indenyl)zirconium dichloride
dimethylsilanediylbis(2-n-butyl-4-(4'-sec-butylphenyl)indenyl)zirconium dichloride
dimethylsilanediylbis(2-n-butyl-4-(4'-tert-butylphenyl)indenyl)zirconium dichloride
dimethylsilanediylbis(2-hexyl-4-phenyl)indenyl)zirconium dichloride
dimethylsilanediylbis(2-hexyl-4-(4'-methylphenyl)indenyl)zirconium dichloride
dimethylsilanediylbis(2-hexyl-4-(4'-ethylphenyl)indenyl)zirconium dichloride
dimethylsilanediylbis(2-hexyl-4-(4'-n-propylphenyl)indenyl)zirconium dichloride
dimethylsilanediylbis(2-hexyl-4-(4'-isopropylphenyl)indenyl)zirconium dichloride
dimethylsilanediylbis(2-hexyl-4-(4'-n-butylphenyl)indenyl)zirconium dichloride
dimethylsilanediylbis(2-hexyl-4-(4'-hexylphenyl)indenyl)zirconium dichloride
dimethylsilanediylbis(2-hexyl-4-(4'-cyclohexylphenyl)indenyl)zirconium dichloride
dimethylsilanediylbis(2-hexyl-4-(4'-sec-butylphenyl)indenyl)zirconium dichloride
dimethylsilanediylbis(2-hexyl-4-(4'-tert-butylphenyl)indenyl)zirconium dichloride
dimethylsilanediylbis(2-methyl-4-(4'-tert-butylphenyl)indenyl)zirconium bis(dimethylamide)

dimethylsilanediylbis(2-ethyl-4-(4'-tert-butylphenyl)
  indenyl)dibenzylzirconium
dimethylsilanediylbis(2-methyl-4-(4'-tert-butylphenyl)
  indenyl)dimethylzirconium
dimethylgermanediylbis(2-ethyl-4-(4'-tert-butylpheny)
  indenyl)zirconium dichloride
dimethylgermanediylbis(2-ethyl-4-(4'-tert-butylphenyl)
  indenyl)hafnium dichloride
dimethylgermanediylbis(2-propyl-4-(4'-tert-butylphenyl)
  indenyl)titanium dichloride
dimethylgermanediylbis(2-methyl-4-(4'-tert-butylphenyl)
  indenyl)zirconium dichloride
ethylidenebis(2-ethyl-4-phenyl)indenyl)zirconium dichloride
ethylidenebis(2-ethyl-4-(4'-tert-butylphenyl)indenyl)
  zirconium dichloride
ethylidenebis(2-n-propyl-4-(4'-tert-butylphenyl)indenyl)
  zirconium dichloride
ethylidenebis(2-n-butyl-4-(4'-tert-butylphenyl)indenyl)
  titanium dichloride
ethylidenebis(2-hexyl-4-(4'-tert-butylphenyl)indenyl)
  dibenzylzirconium
ethylidenebis(2-ethyl-4-(4'-tert-butylphenyl)indenyl)
  dibenzylhafnium
ethylidenebis(2-methyl-4-(4'-tert-butylphenyl)indenyl)
  dibenzyltitanium
ethylidenebis(2-methyl-4-(4'-tert-butylphenyl)indenyl)
  zirconium dichloride
ethylidenebis(2-ethyl-4-(4'-tert-butylphenyl)indenyl)
  dimethylhafnium
ethylidenebis(2-n-propyl-4-phenyl)indenyl)
  dimethyltitanium
ethylidenebis(2-ethyl-4-(4'-tert-butylphenyl)indenyl)
  zirconium bis(dimethylamide)
ethylidenebis(2-ethyl-4-(4'-tert-butylphenyl)indenyl)
  hafnium bis(dimethylamide)
ethylidenebis(2-ethyl-4-(4'-tert-butylphenyl)indenyl)
  titanium bis(dimethylamide)
methylethylidenebis(2-ethyl-4-(4'-tert-butylphenyl)indenyl)
  zirconium dichloride
methylethylidenebis(2-ethyl-4-(4'-tert-butylphenyl)indenyl)
  hafnium dichloride
phenylphosphinediyl(2-ethyl-4-(4'-tert-butylphenyl)
  indenyl)zirconium dichloride
phenylphosphinediyl(2-methyl-4-(4'-tert-butylphenyl)
  indenyl)zirconium dichloride
phenylphosphinediyl(2-ethyl-4-(4'-tert-butylphenyl)
  indenyl)zirconium dichloride The ratio of rac isomer to meso isomer of the metallocene component of the formula (I) in the catalyst system of the invention is from 1:10 to 2:1, preferably from 1:2 to 3:2.

Methods of preparing metallocenes of the formula (I) are described in detail in, for example, Journal of Organometallic Chem. 288 (1985) 63–67 and in the documents cited therein.

The catalyst system of the invention preferably further comprises at least one cocatalyst.

The cocatalyst component which, according to the invention, may be present in the catalyst system, comprises at least one compound such as an aluminoxane or a Lewis acid or an ionic compound which reacts with a metallocene to convert the latter into a cationic compound.

As aluminoxane, preference is given to using a compound of the formula (II):

$$(R \, AlO)_n \qquad (II).$$

Further suitable aluminoxanes can be, for example, cyclic as in formula (III):

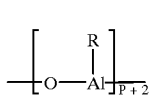
(III)

or linear as in formula (IV)

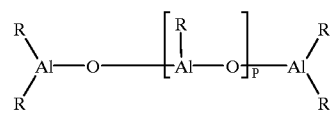
(IV)

or of the cluster type as in formula (V)

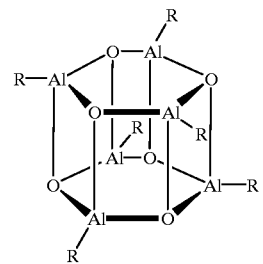
(V)

Such aluminoxanes are described, for example, in JACS 117 (1995), 6465–74, Organometallics 13 (1994), 2957–2969.

The radicals R in the formulae (II), (III), (IV) and (V) may be identical or different and are each a $C_1$–$C_{20}$-hydrocarbon group such as a $C_1$–$C_6$-alkyl group, a $C_6$–$C_{18}$-aryl group, benzyl or hydrogen and p is an integer from 2 to 50, preferably from 10 to 35. Preferably, the radicals R are identical and are methyl, isobutyl, n-butyl, phenyl or benzyl, particularly preferably methyl.

If the radicals R are different, they are preferably methyl and hydrogen, methyl and isobutyl or methyl and n-butyl, where hydrogen or isobutyl or n-butyl are preferably present in a proportion of 0.01–40% (of the number of radicals R).

The aluminoxane can be prepared in various ways by known methods. One of the methods is, for example, reacting an aluminum-hydrocarbon compound and/or a hydridoaluminum-hydrocarbon compound with water (gaseous, solid, liquid or bound— for example as water of crystallization) in an inert solvent (e.g. toluene). To prepare an aluminoxane having different alkyl groups R, two different trialkylaluminums ($AlR_3$+$AlR'_3$) corresponding to the desired composition and reactivity are reacted with water (cf. S. Pasynkiewicz, Polyhedron 9 (1990) 429 and EP-A-0,302,424).

Regardless of the method of preparation, all aluminoxane solutions have in common a variable content of unreacted aluminum starting compound which is present in free form or as adduct.

As Lewis acid, preference is given to using at least one organoboron or organoaluminum compound containing $C_1$–$C_{20}$-groups such as branched or unbranched alkyl or haloalkyl, e.g. methyl, propyl, isopropyl, isobutyl, trifluoromethyl, unsaturated groups such as aryl or haloaryl, e.g. phenyl, tolyl, benzyl groups, p-fluorophenyl, 3,5-difluorophenyl, pentachlorophenyl, pentafluorophenyl, 3,4, 5-trifluorophenyl and 3,5-di(trifluoromethyl)phenyl.

Examples of Lewis acids are trimethylaluminum, triethylaluminum, triisobutylaluminum, tributyl-aluminum, trifluoroborane, triphenylborane, tris(4-fluorophenyl) borane, tris(3,5-difluorophenyl)borane, tris(4-fluoromethylphenyl)borane, tris(pentafluoro-phenyl)borane, tris(tolyl)borane, tris(3,5-dimethylphenyl)borane, tris(3,5-difluorophenyl)borane and/or tris(3,4,5-trifluorophenyl) borane. Very particular preference is given to tris(pentafluorophenyl)borane.

As ionic cocatalysts, preference is given to using compounds which contain a non-coordinating anion, for example tetrakis(pentafluorophenyl)borates, tetraphenylborates, $SbF_6^-$, $CF_3SO_3^-$ or $ClO_4^-$. As cationic counterion, use is made of Lewis bases such as methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethyl-aniline, p-nitro-N,N-dimethylaniline, triethyl-phosphine, triphenylphosphine, diphenylphosphine, tetrahydrothiophene and triphenylcarbenium.

Examples of such ionic compounds which can be used according to the invention are triethylammonium tetra(phenyl)borate
tributylammonium tetra(phenyl)borate
trimethylammonium tetra(tolyl)borate
tributylammonium tetra(tolyl)borate
tributylammonium tetra(pentafluorophenyl)borate
tributylammonium tetra(pentafluorophenyl)aluminate
tripropylammonium tetra(dimethylphenyl)borate
tributylammonium tetra(trifluoromethylphenyl)borate
tributylammonium tetra(4-fluorophenyl)borate
N,N-dimethylanilinium tetra(phenyl)borate
N,N-diethylanilinium tetra(phenyl)borate
N,N-dimethylanilinium tetrakis(pentafluorophenyl)borate
N,N-dimethylanilinium tetrakis(pentafluorophenyl) aluminate
di(propyl)ammonium tetrakis(pentafluorophenyl)borate
di(cyclohexyl)ammonium tetrakis(pentafluorophenyl)borate
triphenylphosphonium tetrakis(phenyl)borate
triethylphosphonium tetrakis(phenyl)borate
diphenylphosphonium tetrakis(phenyl)borate
tri(methylphenyl)phosphonium tetrakis(phenyl)borate
tri(dimethylphenyl)phosphonium tetrakis(phenyl)borate
triphenylcarbenium tetrakis(pentafluorophenyl)borate
triphenylcarbenium tetrakis(pentafluorophenyl)aluminate
triphenylcarbenium tetrakis(phenyl)aluminate
ferrocenium tetrakis(pentafluorophenyl)borate and/or
ferrocenium tetrakis(pentafluorophenyl)aluminate.

Preference is given to triphenylcarbenium tetrakis (pentafluorophenyl)borate and/or N,N-dimethylanilinium tetrakis(pentafluorophenyl)borate.

It is also possible to use mixtures of at least one Lewis acid and at least one ionic compound.

Cocatalyst components which are likewise of importance are borane or carborane compounds such as 7,8-dicarbaundecaborane(13), undecahydrido-7,8-dimethyl-7,8-dicarbaunderaborane, dodecahydrido-1-phenyl-1,3-dicarbanonaborane, tri(butyl)ammonium undecahydrido-8-ethyl -7,9-dicarbaundecaborate, 4-carbanonaborane(14), bis (tri(butyl)ammonium) nonaborate, bis(tri(butyl)ammonium) undecaborate, bis(tri(butyl)ammonium) dodecaborate, bis (tri(butyl)ammonium) decachlorodecaborate tri(butyl) ammonium 1-carbadecaborate, tri(butyl)ammonium 1-carbadodecaborate, tri(butyl)ammonium 1-trimethylsilyl-1-carbadecaborate, tri(butyl)ammonium bis(nonahydrido-1, 3-dicarbanonaborato)cobaltate(III), tri(butyl)ammonium bis (undecahydrido-7,8-dicarbaundecaborato)ferrate(III).

The support components of the catalyst system of the invention may be any organic or inorganic, inert solid, in particular a porous support such as talc, inorganic oxides and finely divided polymer powders (e.g. polyolefins).

Suitable inorganic oxides may be found in groups 2,3,4, 5,13,14,15 and 16 of the Periodic Table of the Elements. Examples of oxides which are preferred as support include silicon dioxide, aluminum oxide and also mixed oxides of the two elements and corresponding oxide mixtures. Other inorganic oxides which can be used alone or in combination with the last-named referred oxidic supports are, for example, MgO, $ZrO_2$, $TiO_2$ and $B_2O_3$, to name but a few.

The support materials used have a specific surface area in the range from 10 to 1000 $m^2/g$, a pore volume in the range from 0.1 to 5 ml/g and a mean particle size from 1 to 500 $\mu$m. Preference is given to supports having a specific surface area in the range from 50 to 500 $\mu$m, a pore volume in the range from 0.5 to 3.5 ml/g and a mean particle size in the range from 5 to 350 $\mu$m. Particular preference is given to supports having a specific surface area in the range from 200 to 400 $m^2/g$, a pore volume in the range from 0.8 to 3.0 ml/g and a mean particle size of from 10 to 200 $\mu$m.

If the support material used naturally has a low moisture content or residual solvent content, dehydration or drying before use can be omitted. If this is not the case, as when using silica gel as support material, dehydration or drying is advisable. The thermal dehydration or drying of the support material can be carried out under reduced pressure with simultaneous inert gas blanketing (e.g. nitrogen). The drying temperature is in the range from 100 to 1000° C., preferably from 200 to 800° C. The parameter pressure is not critical in this case. The duration of the drying process can be from 1 to 24 hours. Shorter or longer drying times are possible provided that equilibration with the hydroxyl groups on the carrier surface can occur under the conditions selected, which normally takes from 4 to 8 hours.

It is also possible to carry out dehydration or drying of the support material by chemical means, by reacting the adsorbed water and the hydroxyl groups on the surface with a suitable passivating agent. Reaction with the passivating agent can convert all or some of the hydroxyl groups into a form which leads to no negative interaction with the catalytically active centers. Suitable passivating agents are, for example, silicon halides and silanes, e.g. silicon tetrachloride, chlorotrimethylsilane, dimethylaminotrichlorosilane, or organometallic compounds of aluminum, boron and magnesium, for example trimethylaluminum, triethylaluminum, triisobutylaluminum, triethylborane, dibutylmagnesium. The chemical dehydration or passivation of the support material is carried out, for example, by reacting, with exclusion of air and moisture, a suspension of the support material in a suitable solvent with the passivating reagent in pure form or as a solution in a suitable solvent. Suitable solvents are, for example, aliphatic or aromatic hydrocarbons such as pentane, hexane, heptane, toluene or xylene. Passivation is carried out at temperatures in the range from 25° C. to 120° C., preferably from 50 to 70° C. Higher and lower temperatures are possible. The reaction time is in the range from 30 minutes to 20 hours, preferably from 1 to 5 hours. After chemical dehydration is complete, the support material is isolated by filtration under inert conditions, washed one or more times with suitable inert solvents as have been described above and subsequently dried in a stream of inert gas or under reduced pressure.

Organic support materials such as finely divided polyolefin powders (e.g. polyethylene, polypropylene or polystyrene) can also be used and should likewise be freed of adhering moisture, solvent residues or other impurities before use by means of appropriate purification and drying operations.

According to the invention, the catalyst system is prepared by mixing at least one specifically substituted metallocene as an rac/meso isomer mixture, at least one cocatalyst and at least one passivated support.

To prepare the supported catalyst system, at least one of the above-described metallocene components is brought into contact in a suitable solvent with at least one cocatalyst component, preferably giving a soluble reaction product, an adduct or a mixture. The composition obtained in this way is then mixed with the dehydrated or passivated support material, the solvent is removed and the resulting supported metallocene catalyst system is dried to ensure that the solvent is completely or mostly removed from the pores of the support material. The supported catalyst is obtained as a free-flowing powder.

A process for preparing a free-flowing and, if desired, prepolymerized supported catalyst system comprises the following steps:

a) Preparation of a metallocene/cocatalyst mixture in a suitable solvent or suspension medium, where the metallocene component has one of the above-described structures, b) Application of the metallocene/cocatalyst mixture to a porous, preferably inorganic dehydrated support, c) Removal of the major part of the solvent from the resulting mixture, d) Isolation of the supported catalyst system, e) If desired, prepolymerization of the supported catalyst system obtained using one or more olefinic monomer(s) in order to obtain a prepolymerized supported catalyst system.

Preferred solvents for preparing the metallocene/cocatalyst mixture are hydrocarbons and hydrocarbon mixtures which are liquid at the reaction temperature selected and in which the individual components preferably dissolve. However, solubility of the individual components is not a prerequisite if it is ensured that the reaction product of metallocene and cocatalyst components is soluble in the solvent chosen. Examples of suitable solvents are alkanes such as pentane, isopentane, hexane, heptane, octane and nonane; cycloalkanes such as cyclopentane and cyclohexane; and aromatics such as benzene, toluene, ethylbenzene and diethylbenzene. Very particular preference is given to toluene.

The amounts of aluminoxane and metallocene used in the preparation of the supported catalyst system can be varied over a wide range. Preference is given to a molar ratio of aluminum to transition metal in the metallocene of from 10:1 to 1000:1, very particularly preferably a ratio of from 50:1 to 500:1.

In the case of methylaluminoxane, preference is given to using 30% toluene solutions, but the use of 10% solutions is also possible.

For preactivation, the metallocene in the form of a solid is dissolved in a solution of the aluminoxane in a suitable solvent. It is also possible to dissolve the metallocene separately in a suitable solvent and subsequently to combine the solution with the aluminoxane solution. Preference is given to using toluene.

The preactivation time is from 1 minute to 200 hours.

The preactivation can take place at room temperature (25° C.). The use of higher temperatures may in some cases shorten the preactivation time required and effect an additional increase in the activity. In this case, higher temperature means a temperature in the range from 50 to 100° C.

The preactivated solution or the metallocene/cocatalyst mixture is subsequently combined with an inert support material, usually silica gel, in the form of a dry powder or as a suspension in one of the abovementioned solvents. The support material is preferably used as powder. The order of addition is immaterial. The preactivated metallocene/cocatalyst solution or the metallocene/cocatalyst mixture can be added to the support material or else the support material can be introduced into the solution.

The volume of the preactivated solution or the metallocene/cocatalyst mixture can exceed 100% of the total pore volume of the support material used or else be upto 100% of the total pore volume.

The temperature at which the preactivated solution or the metallocene/cocatalyst mixture is brought into contact with the support material can vary within a range from 0 to 100° C. However, lower or higher temperatures are also possible.

Subsequently, the solvent is completely or mostly removed from the supported catalyst system, during which the mixture can be stirred and, if desired, also heated. Preference is given to removing both the visible proportion of the solvent and also the proportion within the pores of the support material. Removal of the solvent can be carried out in a conventional way using vacuum and/or flushing with inert gas. In the drying procedure, the mixture can be heated until the free solvent has been removed, which usually takes from 1 to 3 hours at a preferred selected temperature in the range from 30 to 60° C. The free solvent is the visible proportion of solvent in the mixture. For the purposes of the present invention, residual solvent is the proportion which is enclosed in the pores. As an alternative to complete removal of the solvent, the supported catalyst system can be dried only as far as a certain residual solvent content, with the free solvent having been completely removed. The supported catalyst system can subsequently be washed with a low-boiling hydrocarbon such as pentane or hexane and dried again.

The supported catalyst system prepared according to the invention can either be used directly for the polymerization of olefins or can be prepolymerized with one or more olefinic monomers before being used in a polymerization process. The prepolymerization procedure for supported catalyst systems is described, for example, in WO 94/28034. As an additive, a small amount of an olefin, preferably an α-olefin (for example styrene or phenyidimethylvinylsilane), as activity-increasing component or, for example, an antistatic (as described in U.S. patent application Ser. No. 08/365280) can be added during or after the preparation of the supported catalyst system. The molar ratio of additive to metallocene component compound (I) is preferably from 1:1000 to 1000:1, very particularly preferably from 1:20 to 20:1.

The present invention also provides a process for preparing a polyolefin by polymerization of one or more olefins in the presence of the catalyst system of the invention comprising at least one transition metal component of the formula (I). For the purposes of the present invention, the term polymerization refers both to homopolymerization and to copolymerization.

Preference is given to polymerizing olefins of the formula $R_m$—CH═CH—$R_n$, where $R_m$ and $R_n$ are identical or different and are each a hydrogen atom or an organic radical having from 1 to 20 carbon atoms, in particular from 1 to 10 carbon atoms, or $R_m$ and $R_n$ together with the atoms connecting them can form one or more rings.

Examples of such olefins are 1-olefins having 2–40, preferably from 2 to 10, carbon atoms, e.g. ethene, propene, 1-butene, 1-pentene, 1-hexene, 4-methyl-1-pentene or 1-octene, styrene, dienes such as 1,3-butadiene, 1,4-hexadiene, vinylnorbornene, norbornadiene, ethylnorbornadiene and cyclic olefins such as norbornene, tetracyclododecene or methylnorbornene. In the process of the invention, preference is given to homopolymerizing propene or ethene or copolymerizing propene with ethene and/or with one or more 1-olefins having from 4 to 20 carbon atoms, e.g. hexene, and/or one or more dienes having from 4 to 20 carbon atoms, e.g. 1,4-butadiene, norbornadiene, ethylidenenorbornene or ethylnorbornadiene. Examples of such copolymers are ethene-propene copolymers or ethene-propene-1,4-hexadiene terpolymers.

The polymerization is carried out at a temperature of from −60 to 300° C., preferably from 50 to 200° C., very particularly preferably 50–80° C. The pressure is from 0.5 to 2000 bar, preferably from 5 to 64 bar.

The polymerization can be carried out in solution, in bulk, in suspension or in the gas phase, continuously or batchwise, in one or more stages.

The catalyst system prepared according to the invention can be used as sole catalyst component for the polymerization of olefins having from 2 to 20 carbon atoms or preferably be used in combination with at least one alkyl compound of the elements of main group I to III of the Periodic Table, for example an aluminum alkyl, magnesium alkyl or lithium alkyl or an aluminoxane. The alkyl compound is added to the monomer or the suspension medium and serves to free the monomer of substances which could impair the catalytic activity. The amount of alkyl compound added depends on the quality of the monomers used.

As molar mass regulator and/or to increase the activity, hydrogen is added if necessary.

In addition, an antistatic can be metered into the polymerization system during the polymerization, either together with or separately from the catalyst system used.

The polymers prepared using the catalyst system of the invention display a uniform particle morphology and contain no fines. No deposits or caked material occur in the polymerization using the catalyst system of the invention.

The catalyst system of the invention gives polymers, e.g. polypropylene, having extraordinarily high stereospecificity and regiospecificity.

A particularly characteristic parameter for the stereospecificity and regiospecificity of polymers, in particular polypropylene, is the triad tacticity (TT) and the proportion of 2-1-inserted propene units (RI) which can both be determined from the $^{13}$C-NMR spectra.

The $^{13}$C-NMR spectra are measured at elevated temperature (365 K) in a mixture of hexachlorobutadiene and $d_2$-tetrachloroethane. The resonance signal of $d_2$-tetrachloroethane ($\delta$=73.81 ppm) is used as internal reference for all the $^{13}$C-NMR spectra of the polypropylene samples measured.

To determine the triad tacticity of polypropylene, the methyl resonance signals in the $^{13}$C-NMR spectrum from 23 to 16 ppm are examined; cf. J. C. Randall, Polymer Sequence Determination: Carbon-13 NMR Method, Academic Press New York 1978; A. Zambelli, P. Locatelli, G. Bajo, F. A. Bovey, Macromolecules 8 (1975), 687–689; H. N. Cheng, J. A. Ewen, Makromol. Chem. 190 (1989), 1931–1943. Three successive 1-2-inserted propene units whose methyl groups are arranged on the same side in the "Fischer Projection" are referred to as mm triads ($\delta$=21.0 ppm to 22.0 ppm). If only the second methyl group of the three successive propene units points to the other side, one speaks of an rr triad (d=19.5 ppm to 20.3 ppm), and if only the third methyl group of the three successive propene units points to the other side, of an mr triad (d=20.3 ppm to 21.0 ppm). The triad tacticity is calculated using the following formula:

$$TT (\%)=mm/(mm+mr+rr)\cdot 100$$

If a propene unit is inserted inversely into the growing polymer chain, this is referred to as a 2-1 insertion; cf. T. Tsutsui, N. Ishimaru, A. Mizuno, A. Toyota, N. Kashiwa, Polymer 30 (1989), 1350–56. The following different structural arrangements are possible:

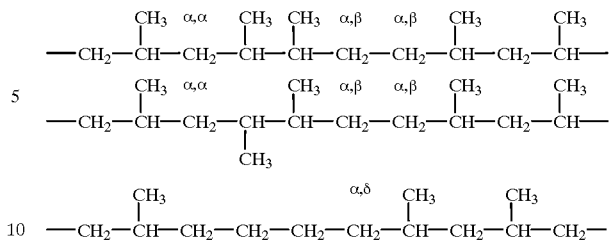

The proportion of 2-1-inserted propene units (RI) can be calculated using the following formula:

$$RI(\%)=0.5\ Ia,\beta(Ia,a+Ia,\beta+Ia,d)\cdot 100,$$

where

Ia,a is the sum of the intensities of the resonance signals at $\delta$=41.84, 42.92 and 46.22 ppm, Ia,$\beta$ is the sum of the intensities of the resonance signals at $\delta$=30.13, 32.12, 35.11 and 35.57 ppm and Ia,d is the intensity of the resonance signal at $\delta$=37.08 ppm.

The isotactic polypropylene which has been prepared using the catalyst system of the invention has a proportion of 2-1-inserted propene units RI of <0.5% at a triad tacticity TT of >98.0% and a melting point of >153° C., and the $M_w/M_n$ of the polypropylene prepared according to the invention is in the range from 2.5 to 3.5.

The copolymers which can be prepared using the catalyst system of the invention have a significantly higher molar mass compared to those of the prior art. At the same time, such copolymers can be prepared at high productivity at industrially relevant process parameters without deposit formation by using the catalyst system of the invention.

The polymers prepared by the process of the invention are suitable, in particular, for producing tear-resistant, hard and stiff shaped articles such as fibers, filaments, injection-molded parts, films, sheets or large hollow bodies (e.g. pipes).

The invention is illustrated by the following examples which do not, however, restrict the scope of the invention.

General procedures: Preparation and handling of the organometallic compounds was carried out with exclusion of air and moisture under argon protective gas (Schlenk techniques or glove box). All solvents required were purged with argon and dried over molecular sieves before use.

EXAMPLE 1

Dimethylsilanediylbis(2-methyl-4-(4'-ethylphenyl) indenyl)zirconium dichloride (rac/meso ratio=1:6)

Preparation of the Supported Catalyst System 62 mg of dimethylsilanediylbis(2-methyl-4-(4'-ethylphenyl)indenyl)zirconium dichloride (rac/meso=1:6; 0.092 mmol) were mixed with 4.3 ml of 30% MAO solution (20 mmol) in toluene and a further 1.9 ml of toluene and the mixture was stirred for 1 hour at room temperature while being protected from light. 4 g of $SiO_2$ were then added while stirring and, after the addition was complete, the mixture was stirred for another 10 minutes. Removal of the solvent in an oil pump vacuum gave a free-flowing powder.

Polymerization

A dry 16 $dm^3$ reactor was flushed first with nitrogen and then subsequently with propylene and charged with 10 $dm^3$ of liquid propylene. 0.5 $cm^3$ of a 20% triisobutylaluminum solution in Varsol diluted with 30 $cm^3$ of Exxsol was then introduced into the reactor and the mixture was stirred for 15 minutes at 30° C. The catalyst suspension of 2 g of the supported metallocene catalyst in 20 cm³ of Exxsol was subsequently introduced into the reactor. The reaction mixture was then heated to 60° C. (4° C./minute) and the polymerization system was held at 60° C. for 1 hour by cooling. The polymerization was stopped by venting and the polymer obtained was dried under reduced pressure. This gave 2.0 kg of polypropylene powder. The reactor displayed no deposits on the inner wall or stirrer. The catalyst activity was 1000 g of PP/(g of Cat×h).

EXAMPLE 2

Dimethylsilanediylbis(2-n-butyl-4-phenylindenyl) zirconium dichloride (rac/meso ratio=1:2)
Preparation of the Supported Catalyst System The procedure of Example 1 was repeated using 65 mg of dimethylsilanediylbis(2-n-butyl-4-phenylindenyl) zirconium dichloride (rac/meso 1:2; 0.091 mmol) to prepare the corresponding supported catalyst system.
Polymerization The polymerization was carried out by a method analogous to Example 1. The reactor displayed no deposits on the inner wall or stirrer. 2.4 kg of polypropylene powder were obtained. The catalyst activity was 1200 g of PP/(g of Cat×h).

EXAMPLE 3

Dimethylsilanediylbis(2-ethyl-4-(4'-tert-butylphenyl) indenyl)zirconium dichloride (rac/meso ratio=1:1)
Preparation of the Supported Catalyst System The procedure of Example 1 was repeated using 70 mg of dimethylsilanediylbis(2-ethyl-4-(4'-tert-butylphenyl) indenyl)zirconium dichloride (rac/meso 1:1; 0.091 mmol) to prepare the corresponding supported catalyst system.
Polymerization The polymerization was carried out by a method analogous to Example 1. The reactor displayed no deposits on the inner wall or stirrer. 3.0 kg of polypropylene powder were obtained. The catalyst activity was 1500 g of PP/(g of Cat×h).

EXAMPLE 4

Dimethylsilanediylbis(2-methyl-4-(4'-methylphenyl) indenyl)zirconium dichloride (rac/meso ratio=2:3)
Preparation of the Supported Catalyst System The procedure of Example 1 was repeated using 60 mg of dimethylsilanediylbis(2-methyl-4-(4'-methylphenyl) indenyl)zirconium dichloride (rac/meso 2:3; 0.091 mmol) to prepare the corresponding supported catalyst system.
Polymerisation The polymerization was carried out by a method analogous to Example 1. The reactor displayed no deposits on the inner wall or stirrer. 2.2 kg of polypropylene powder were obtained. The catalyst activity was 1100 g of PP/(g of Cat×h).

EXAMPLE 5

Dimethylgermanediylbis(2-methyl-4-(4'-tert-butylphenyl)indenyl)-zirconium dichloride (rac/meso ratio=1:1)
Preparation of the Supported Catalyst System The procedure of Example 1 was repeated using 71 mg of dimethylgermanediylbis(2-methyl-4-(4'-tert-butylphenyl) indenyl)zirconium dichloride (rac/meso 1:1; 0.091 mmol) to prepare the corresponding supported catalyst system.
Polymerization The polymerization was carried out by a method analogous to Example 1. The reactor displayed no deposits on the inner wall or stirrer. 5.2 kg of polypropylene powder were obtained. The catalyst activity was 2600 g of PP/(g of Cat×h).

Comparative Example rac-Dimethylsilanediylbis(2-methyl-4-phenylindenyl)zirconium dichloride
Preparation of the Supported Catalyst System The procedure of Example 1 was repeated using 57 mg of rac-dimethylsilanediylbis(2-methyl-4-phenylindenyl) zirconium dichloride (0.091 mmol) to prepare the corresponding supported catalyst system.
Polymerization The polymerization was carried out using a method analogous to Example 1. The reactor displayed no deposits on the inner wall or stirrer. 2.4 kg of polypropylene powder were obtained. The catalyst activity was 1200 g of PP/(g of Cat×h).

The polymerization results from the Examples are shown in Table I.

TABLE I

| Example | rac/meso | rac content | Yield [kg of PP] | Activity [kg of PP/g of Cat/h] | M.p. [° C.] |
|---------|----------|-------------|------------------|--------------------------------|-------------|
| 1 | 1:6 | 14.2% | 2.0 | 1.0 | 155 |
| 2 | 1:2 | 33.3% | 2.4 | 1.2 | 156 |
| 3 | 1:1 | 50% | 3.0 | 1.5 | 156 |
| 4 | 2:3 | 40% | 2.2 | 1.1 | 154 |
| 5 | 1:1 | 50% | 5.2 | 2.6 | 156 |
| Comparison | rac | 100% | 2.4 | 1.2 | 150 |

What is claimed is:

1. A catalyst system comprising:
   a) at least one support,
   b) at least one cocatalyst,
   c) an rac/meso isomer mixture of at least one metallocene of the formula (I):

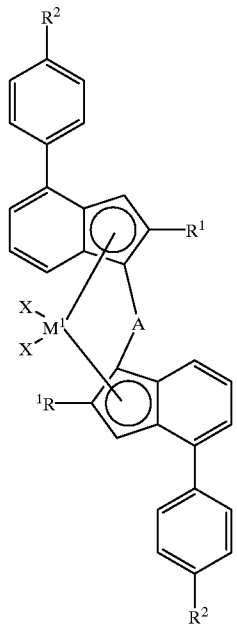

(I)

where
R¹ and R² are identical or different and are each a hydrogen atom or a $C_1$–$C_{20}$-hydrocarbon group, with the restriction that $R^1$ is not methyl when $R^2$ is hydrogen, $M^1$ is a transition metal of group 4, 5 or 6 of the Periodic Table of the Elements, A is a bridge of the formula:

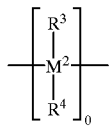 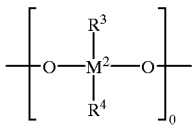 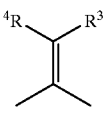

or $=BR^3$, $AlR^3$, —S—, —SO—, —$SO_2$—, $=NR^3$, $=PR^3$, $=P(O)R^3$, o-phenylene, 2,2'-biphenylene, where $M^2$ is carbon, silicon, germanium, tin, nitrogen or phosphorus, o is 1, 2, 3 or 4, $R^3$ and $R^4$ are identical or different and are each, independently of one another, a hydrogen atom, halogen, a $C_1$–$C_{20}$-group or $R^3$ and $R^4$ can together form a monocyclic or polycyclic ring system, and X are identical or different and are each a hydrogen atom, a halogen atom, a hydroxyl group, a $C_1$–$C_{10}$-alkyl group, a $C_6$–$C_{15}$-aryl group, a $C_1$–$C_{10}$-alkoxy group, a $C_6$–$C_{15}$-aryloxy group, a benzyl group, an $NR^5_2$ group, where $R^5$ are identical or different and are each a $C_1$–$C_{10}$-alkyl group, $C_6$–$C_{15}$-aryl group, a $(CH_3)_3Si$ group, where the ratio of rac isomer to meso isomer of the metallocene of the formula (I) in the catalyst system of the invention is from 1:10 to 2:1 and wherein the cocatalyst used is an aluminoxane or a Lewis acid or an ionic compound which reacts with a metallocene to convert the latter into a cationic compound.

2. A catalyst system as claimed in claim 1, wherein the compound of the formula (I):

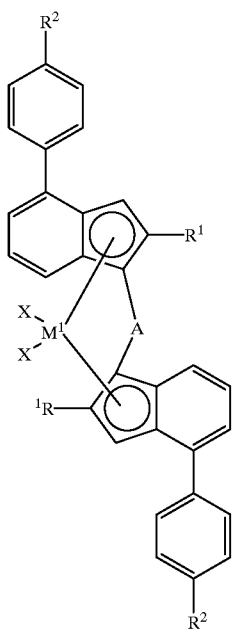

(I)

is one in which $R^1$ and $R^2$ are identical or different and are each a hydrogen atom, a $C_1$–$C_{20}$-alkyl group, a $C_6$–$C_{14}$-aryl group, a $C_2$–$C_{20}$-alkenyl group, with the restriction that $R^1$ is not methyl when $R^2$ is hydrogen, $M^1$ is titanium, zirconium, hafnium, vanadium, niobium, tantalum, chromium, molybdenum or tungsten, A is dimethylsilanediyl, dimethylgermanediyl, ethylidene, methylethylidene, 1,1-dimethylethylidene, 1,2-dimethylethylidene, tetramethylethylidene, isopropylidene, phenylmethylmethylidene or diphenylmethylidene, X are identical or different and are each a hydrogen atom, fluorine, chlorine, bromine or iodine, a hydroxyl group, methyl, ethyl, propyl, isopropyl, n-butyl, isobutyl, sec-butyl, tert-butyl, hexyl, cyclohexyl, phenyl, naphthyl, methoxy, ethoxy, tert-butoxy, an $NR^5_2$ group, where $R^5$ are identical or different and are each methyl and/or ethyl, a chlorine atom, a fluorine atom, where the ratio of rac isomer to meso isomer of the metallocene of the formula (I) in the catalyst system is from 1:2 to 3:2.

3. A catalyst system as claimed in claim 1, wherein the compound of the formula (I):

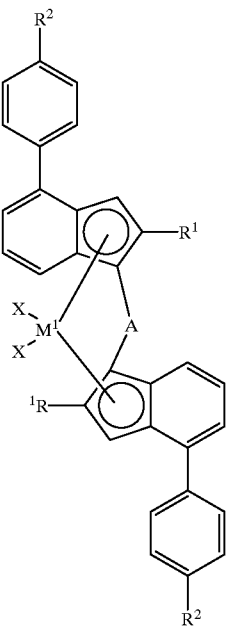

(I)

is one in which $R^1$ and $R^2$ are identical or different and are each hydrogen, methyl, ethyl, n-propyl, isopropyl, n-butyl, sec-butyl, isobutyl, tert-butyl, pentyl or hexyl, with the restriction that $R^1$ is not methyl when $R^2$ is hydrogen, $M^1$ is zirconium, A is dimethylsilanediyl, dimethylgermanediyl or ethylidene, X are identical or different and are each hydrogen, fluorine, chlorine, bromine a hydroxyl group, methyl, ethyl, propyl, isopropyl, n-butyl, isobutyl, sec-butyl, tert-butyl, hexyl, cyclohexyl, phenyl, naphthyl, methoxy, ethoxy or tert-butoxy, where the ratio of rac isomer to meso isomer of the metallocene of the formula (I) in the catalyst system is from 1:2 to 3:2.

4. A catalyst system as claimed in claim 1, wherein the compound of the formula (I) which is used is dimethylsilanediylbis(2-methyl-4-(4'-tert-butylphenyl) indenyl)zirconium dichloride
dimethylsilanediylbis(2-methyl-4-(4'-tert-butylphenyl) indenyl)hafnium dichloride
dimethylsilanediylbis(2-methyl-4-(4'-tert-butylphenyl) indenyl)titanium dichloride
dimethylsilanediylbis(2-methyl-4-(4'-methylphenyl) indenyl)zirconium dichloride
dimethylsilanediylbis(2-methyl-4-(4'-ethylphenyl)indenyl) zirconium dichloride
dimethylsilanediylbis(2-methyl-4-(4'-n-propylphenyl) indenyl)zirconium dichloride
dimethylsilanediylbis(2-methyl-4-(4'-isopropylphenyl) indenyl)zirconium dichloride
dimethylsilanediylbis(2-methyl-4-(4'-n-butylphenyl) indenyl)zirconium dichloride
dimethylsilanediylbis(2-methyl-4-(4'-hexylphenyl)indenyl) zirconium dichloride
dimethylsilanediylbis(2-methyl-4-(4'-sec-butylphenyl) indenyl)zirconium dichloride
dimethylsilanediylbis(2-ethyl-4-phenyl)indenyl)zirconium dichloride
dimethylsilanediylbis(2-ethyl-4-(4'-methylphenyl)indenyl) zirconium dichloride
dimethylsilanediylbis(2-ethyl-4-(4'-ethylphenyl)indenyl) zirconium dichloride
dimethylsilanediylbis(2-ethyl-4-(4'-n-propylphenyl) indenyl)zirconium dichloride
dimethylsilanediylbis(2-ethyl-4-(4'-isopropylphenyl) indenyl)zirconium dichloride
dimethylsilanediylbis(2-ethyl-4-(4'-n-butylphenyl)indenyl) zirconium dichloride
dimethylsilanediylbis(2-ethyl-4-(4'-hexylphenyl)indenyl) zirconium dichloride
dimethylsilanediylbis(2-ethyl-4-(4'-pentylphenyl)indenyl) zirconium dichloride
dimethylsilanediylbis(2-ethyl-4-(4'-cyclohexylphenyl) indenyl)zirconium dichloride
dimethylsilanediylbis(2-ethyl-4-(4'-sec-butylphenyl) indenyl)zirconium dichloride
dimethylsilanediylbis(2-ethyl-4-(4'-tert-butylphenyl) indenyl)zirconium dichloride
dimethylsilanediylbis(2-n-propyl-4-phenyl)indenyl) zirconium dichloride
dimethylsilanediylbis(2-n-propyl-4-(4'-methylphenyl) indenyl)zirconium dichloride
dimethylsilanediylbis(2-n-propyl-4-(4'-ethylphenyl) indenyl)zirconium dichloride
dimethylsilanediylbis(2-n-propyl-4-(4'-n-propylphenyl) indenyl)zirconium dichloride
dimethylsilanediylbis(2-n-propyl-4-(4'-isopropylphenyl) indenyl)zirconium dichloride
dimethylsilanediylbis(2-n-propyl-4-(4'-n-butylphenyl) indenyl)zirconium dichloride
dimethylsilanediylbis(2-n-propyl-4-(4'-hexylphenyl) indenyl)zirconium dichloride
dimethylsilanediylbis(2-n-propyl-4-(4'-cyclohexylphenyl) indenyl)zirconium dichloride
dimethylsilanediylbis(2-n-propyl-4-(4'-sec-butylphenyl) indenyl)zirconium dichloride
dimethylsilanediylbis(2-n-propyl-4-(4'-tert-butylphenyl) indenyl)zirconium dichloride
dimethylsilanediylbis(2-n-butyl-4-phenyl)indenyl) zirconium dichloride
dimethylsilanediylbis(2-n-butyl-4-(4'-methylphenyl) indenyl)zirconium dichloride
dimethylsilanediylbis(2-n-butyl-4-(4'-ethylphenyl)indenyl) zirconium dichloride
dimethylsilanediylbis(2-n-butyl-4-(4'-n-propylphenyl) indenyl)zirconium dichloride
dimethylsilanediylbis(2-n-butyl-4-(4'-isopropylphenyl) indenyl)zirconium dichloride
dimethylsilanediylbis(2-n-butyl-4-(4'-n-butylphenyl) indenyl)zirconium dichloride
dimethylsilanediylbis(2-n-butyl-4-(4'-hexylphenyl)indenyl) zirconium dichloride
dimethylsilanediylbis(2-n-butyl-4-(4'-cyclohexylphenyl) indenyl)zirconium dichloride
dimethylsilanediylbis(2-n-butyl-4-(4'-sec-butylphenyl) indenyl)zirconium dichloride
dimethylsilanediylbis(2-n-butyl-4-(4'-tert-butylphenyl) indenyl)zirconium dichloride
dimethylsilanediylbis(2-hexyl-4-phenyl)indenyl)zirconium dichloride
dimethylsilanediylbis(2-hexyl-4-(4'-methylphenyl)indenyl) zirconium dichloride
dimethylsilanediylbis(2-hexyl-4-(4'-ethylphenyl)indenyl) zirconium dichloride
dimethylsilanediylbis(2-hexyl-4-(4'-n-propylphenyl) indenyl)zirconium dichloride
dimethylsilanediylbis(2-hexyl-4-(4'-isopropylphenyl) indenyl)zirconium dichloride
dimethylsilanediylbis(2-hexyl-4-(4'-n-butylphenyl)indenyl) zirconium dichloride
dimethylsilanediylbis(2-hexyl-4-(4'-hexylphenyl)indenyl) zirconium dichloride
dimethylsilanediylbis(2-hexyl-4-(4'-cyclohexylphenyl) indenyl)zirconium dichloride
dimethylsilanediylbis(2-hexyl-4-(4'-sec- butylphenyl) indenyl)zirconium dichloride
dimethylsilanediylbis(2-hexyl-4-(4'-tert-butylphenyl) indenyl)zirconium dichloride
dimethylsilanediylbis(2-methyl-4-(4'-tert-butylphenyl) indenyl)zirconium bis(dimethylamide)
dimethylsilanediylbis(2-ethyl-4-(4'-tert-butylphenyl) indenyl)dibenzylzirconium
dimethylsilanediylbis(2-methyl-4-(4'-tert-butylphenyl) indenyl)dimethyl-zirconium
dimethylgermanediylbis(2-ethyl-4-(4'-tert-butylphenyl) indenyl)zirconium dichloride
dimethylgermanediylbis(2-methyl-4-(4'-tert-butylphenyl) indenyl)zirconium dichloride
dimethylgermanediylbis(2-ethyl-4-(4'-tert-butylphenyl) indenyl)hafnium dichloride
dimethylgermanediylbis(2-propyl-4-(4'-tert-butylphenyl) indenyl)titanium dichloride
ethylidenebis(2-ethyl-4-phenyl)indenyl)zirconium dichloride
ethylidenebis(2-ethyl-4-(4'-tert-butylphenyl)indenyl) zirconium dichloride
ethylidenebis(2-n-propyl-4-(4'-tert-butylphenyl)indenyl) zirconium dichloride
ethylidenebis(2-n-butyl-4-(4'-tert-butylphenyl)indenyl) titanium dichloride
ethylidenebis(2-hexyl-4-(4'-tert-butylphenyl)indenyl) dibenzylzirconium
ethylidenebis(2-ethyl-4-(4'-tert-butylphenyl)indenyl) dibenzylhafnium
ethylidenebis(2-methyl-4-(4'-tert-butylphenyl)indenyl) dibenzyltitanium
ethylidenebis(2-methyl-4-(4'-tert-butylphenyl)indenyl) zirconium dichloride
ethylidenebis(2-ethyl-4-(4'-tert-butylphenyl)indenyl) dimethylhafnium ethylidenebis(2-n-propyl-4-phenyl)indenyl) dimethyltitanium
ethylidenebis(2-ethyl-4-(4'-tert-butylphenyl)indenyl) zirconium bis(dimethylamide)
ethylidenebis(2-ethyl-4-(4'-tert-butylphenyl)indenyl) hafnium bis(dimethylamide)
ethylidenebis(2-ethyl-4-(4'-tert-butylphenyl)indenyl) titanium bis(dimethylamide)
methylethylidenebis(2-ethyl-4-(4'-tert-butylphenyl)indenyl) zirconium dichloride
methylethylidenebis(2-ethyl-4-(4'-tert-butylphenyl)indenyl) hafnium dichloride
phenylphosphinediyl(2-ethyl-4-(4'-tert-butylphenyl) indenyl)zirconium dichloride
phenylphosphinediyl(2-methyl-4-(4'-tert-butylphenyl) indenyl)zirconium dichloride
phenylphosphinediyl(2-ethyl-4-(4'-tert-butylphenyl) indenyl)zirconium dichloride.

5. The catalyst system as claimed in claim 1, wherein the support used is an organic or inorganic, inert solid.

6. A process for preparing a polyolefin by polymerization of one or more olefins in the presence of the catalyst system as claimed in claim 1.

* * * * *